No. 614,639. Patented Nov. 22, 1898.
H. WEAVER & F. M. SCRANTON.
CUTTING APPARATUS FOR HARVESTERS.
(Application filed Nov. 4, 1897.)
(No Model.)
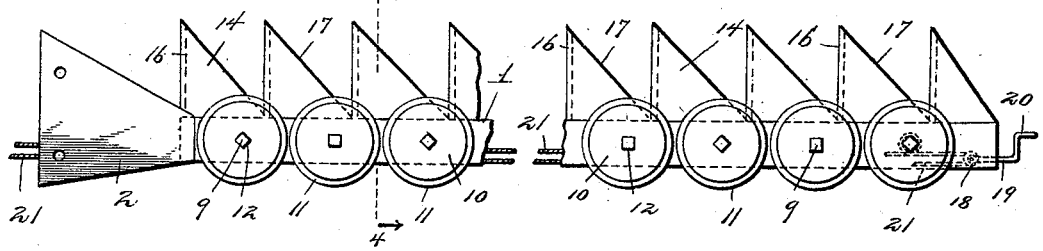
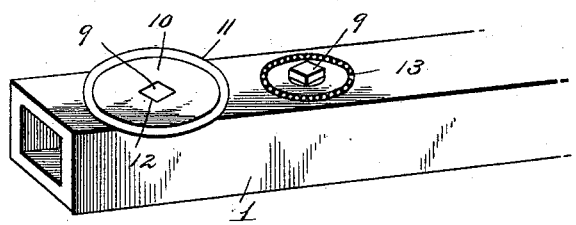
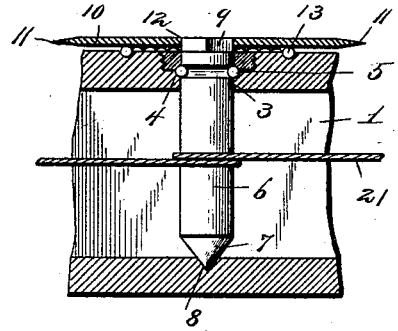
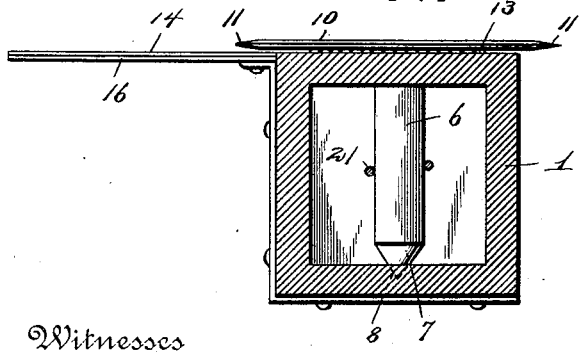
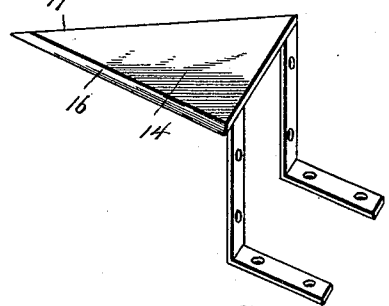
Witnesses
Harry L. Amer.
Victor J. Evans
Inventors
Hiram Weaver and
Francis M. Scranton.
by V. S. Stockbridge
their Attorney

UNITED STATES PATENT OFFICE.

HIRAM WEAVER AND FRANCIS MARION SCRANTON, OF NEBO, ILLINOIS.

CUTTING APPARATUS FOR HARVESTERS.

SPECIFICATION forming part of Letters Patent No. 614,639, dated November 22, 1898.

Application filed November 4, 1897. Serial No. 657,440. (No model.)

*To all whom it may concern:*

Be it known that we, HIRAM WEAVER and FRANCIS MARION SCRANTON, citizens of the United States, residing at Nebo, in the county of Pike and State of Illinois, have invented certain new and useful Improvements in Cutting Apparatus for Harvesters; and we do hereby declare the following to be a full, clear, and exact description of the invention, such as will enable others skilled in the art to which it appertains to make and use the same.

Our present invention relates to a novel cutting apparatus for harvesting-machines, the object of the invention being to produce mechanism of this character which will develop a maximum efficiency with a minimum expenditure of power, which will not be liable to derangement, and which will lighten the draft of the machine by effecting the cutting of the grain or grass with the least possible resistance.

The construction by which the object above named is sought to be attained will be understood from the following description and claims.

Referring to the drawings, Figure 1 is a plan view of our cutting apparatus complete. Fig. 2 is a detail view of a portion of the finger-bar stripped of its connected part, with the exception of the spindles. Fig. 3 is a central vertical section through one of the spindles and its disk, showing a portion of the finger-bar. Fig. 4 is a transverse sectional view on the line 4 4, Fig. 1; and Fig. 5 is a detail view of one of the guards.

Referring to the numerals on the drawings, 1 indicates a hollow finger-bar, preferably substantially rectangular in cross-section and secured at one end to the harvester-frame by the usual shoe 2. The top of the bar 1 is provided with a longitudinal series of bearing-apertures 3, provided with internal annular ball-grooves 4 for the reception of a series of antifriction-balls 5. These bearing-apertures are designed for the reception of the upper ends of a series of spindles 6, having their lower ends pointed and hardened by chilling or otherwise to form a cone-bearing 7, designed to rest in minor bearing depressions or sockets 8 in the upper face of the bottom of the cutter-bar. Each of the spindles is provided upon its upper end with a square stud 9, designed to receive a cutting-disk 10, provided with a sharpened periphery 11, and a square axial aperture 12, designed to fit over the stud 9.

It will be seen that the disks 10 are arranged in a longitudinal series along the top of the cutter-bar and that the frictional contact of the spindles as they rotate will be reduced to the minimum by the interposition of the ball-bearing between their upper ends and the walls of the bearing-apertures 3. In order, however, to prevent frictional contact between the disks and the upper surface of the cutter-bar, we provide ball-bearings 13 in annular grooves or ball-races, in the top wall of the latter, surrounding the spindles, the cutter-disks being designed to rest upon the balls in such manner as to rotate with as little friction as possible.

14 indicate guards extending in front of the finger-bar and located immediately below the rotary cutters or disks, angular supporting-brackets extending from the rear sides of the guards and bolted to the under side of the finger-bar to retain the guards in their proper positions. The guards 14 are of substantially triangular form and are each provided with a cutting edge 16, extending at right angles to the finger-bar in a line tangential to the adjacent disk, and with an inclined guiding edge 17, extending from the extremity of the cutting edge to the finger-bar at the base of the cutting edge of the next guard. By this construction the material to be cut will be forced between the guide edge of one guard and the cutting edge of the next adjacent guard and if not severed by the latter will come in contact with the rotary cutters, which will effectually sever the grain or grass without permitting the latter to present an appreciable resistance to the progress of the machine.

The construction thus far described constitutes the cutting mechanism proper, as it will be obvious that any mechanism may be employed in rotating the spindles and cutters; but inasmuch as such actuating mechanism constitutes an essential feature of the invention it will be described in detail.

18 indicates a roller journaled in a suitable bearing-frame swiveled at the inner extremity of an adjusting-rod 19, passing through a screw-threaded aperture in the outer end of the finger-bar and designed to be rotated by a crank 20 to accomplish the adjustment of the roller 18.

21 indicates an endless band passing around a suitable drum (not illustrated) carried by the harvester-frame and likewise passed around the roller 18, one side or strand of the band 21 being wound around each of the spindles in the proper direction to cause the synchronous rotation of the spindles and cutting-disks. The band is kept at the desired tension by the adjustment of the roller 18 in the manner described.

It will be observed from the foregoing that we have invented a simple and efficient cutting apparatus, comprising a series of fixed cutters and a series of rotary cutters coöperating therewith, actuated by a novel device and provided with antifriction mechanism, which is designed to reduce the frictional contact between the parts to a minimum; but while the present embodiment of our invention appears at this time to be preferable we do not desire to limit ourselves to the structural details hereinbefore set forth, but reserve the right to change, modify, and vary the same at will within the scope of the protection prayed.

What we claim is—

1. In a cutting apparatus for harvesters, the combination with a finger-bar and a rotary cutter, of guards provided with a straight-away cutting edge at right angles to the cutter-bar or in line with the direction of travel, and a dull guard edge extending at an oblique angle from the inner end of the cutting edge, substantially as specified.

2. In a cutting apparatus for harvesters, the combination with a hollow finger-bar, of a series of rotary disk-cutters carried thereby, means for imparting a continuous rotation in the same direction to said cutters, and a series of guards provided each with a straight cutting edge at right angles to the finger-bar, and an oblique guiding edge arranged to coöperate with the rotary cutter for carrying the material operated upon to the cutting edge, substantially as described.

3. In a cutting apparatus for harvesters, the combination with a hollow finger-bar, of guards carried thereby, said guards being provided respectively with a cutting edge extending at right angles to the bar or in line with the direction of travel, and an inclined guard edge extending from the outer extremity of the cutting edge to the inner extremity of the cutting edge of the adjacent guard, and a series of rotary disk-cutters having their edges projecting beyond the inclined guard edges and into coöperative relation with the cutting edges of the guards, substantially as specified.

4. In a cutting apparatus for harvesters, the combination with a hollow finger-bar, guards extending from the front edge of the bar adjacent to its upper surface, said guards being provided respectively with a cutting edge extending at right angles to the bar or in the direction of travel, and an inclined guard edge, a series of rotary disk-cutters carried by the bar and having their edges projected beyond the guard edges of the guards and into coöperative relation with the straight-away cutting edges, spindles supporting the cutters and having bearing in the top and bottom walls of the bar, a tension-roller adjacent to one extremity of the finger-bar, and an actuating-band passed into the cutter-bar, wound completely around each of the spindles in the same direction, passed over the tension-roller and doubled back upon itself, substantially as specified.

In testimony whereof we have signed this specification in the presence of two subscribing witnesses.

HIRAM WEAVER.
FRANCIS MARION SCRANTON.

Witnesses:
W. L. COLEY,
J. D. HESS.